United States Patent [19]
Murata et al.

[11] Patent Number: 5,797,583
[45] Date of Patent: Aug. 25, 1998

[54] VALVE DRIVING APPARATUS

[75] Inventors: Kiyoshi Murata, Sakai; Takashi Komiya, Ibaraki; Sadayuki Nakanishi, Itami; Yoshiharu Sato, Nakakoma-gun; Akio Fukunaga, Kakogawa, all of Japan

[73] Assignee: Kitz Corporation, Chiba, Japan

[21] Appl. No.: 513,085

[22] Filed: Aug. 9, 1995

[30] Foreign Application Priority Data

Aug. 10, 1994 [JP] Japan .................... 6-209248

[51] Int. Cl.⁶ .......................... F16K 31/122; F15B 1/02; F15B 3/00
[52] U.S. Cl. .......................... 251/57; 60/415; 91/4 R
[58] Field of Search .................. 251/57; 60/403, 60/406, 547.1, 547.2, 547.3, 407, 413, 415; 91/4 R

[56] References Cited

U.S. PATENT DOCUMENTS

| | | | |
|---|---|---|---|
| 1,616,841 | 2/1927 | Beebe | 251/57 |
| 2,141,703 | 12/1938 | Bays | 60/415 |
| 2,413,876 | 1/1947 | Lefler | 60/415 |
| 2,449,554 | 9/1948 | Helber | 60/415 |
| 2,587,449 | 2/1952 | Ericson | 60/415 |
| 2,641,106 | 6/1953 | Jelinek | 60/415 |
| 3,182,971 | 5/1965 | Wakeman et al. | 251/57 |
| 3,223,114 | 12/1965 | Shafer | 91/4 R |
| 4,024,884 | 5/1977 | Prescott et al. | 251/57 |
| 4,043,533 | 8/1977 | Cowley | 251/57 |
| 4,187,681 | 2/1980 | Johnson | 60/403 |
| 4,223,531 | 9/1980 | Fukunaga et al. | 60/403 |
| 4,268,007 | 5/1981 | Chittenden | 251/57 |
| 4,296,911 | 10/1981 | Escobosa | 251/57 |
| 4,348,863 | 9/1982 | Taylor et al. | 60/415 |
| 4,405,014 | 9/1983 | Talafuse | 251/57 |
| 4,412,670 | 11/1983 | Card et al. | 60/403 |
| 4,432,240 | 2/1984 | Gregory et al. | 60/415 |
| 5,058,614 | 10/1991 | Plohberger et al. | 251/57 |

FOREIGN PATENT DOCUMENTS

| | | | |
|---|---|---|---|
| 585057 | 10/1959 | Canada | 251/57 |
| 728436 | 11/1942 | Germany | 251/57 |

Primary Examiner—George L. Walton
Attorney, Agent, or Firm—Wenderoth, Lind & Ponack, L.L.P.

[57] ABSTRACT

A valve driving apparatus for actuating a shut-off valve provided in a pipeline conveying a fluid includes a gas/oil booster having an oil chamber and a gas chamber. A valve-driving actuator has a cylinder connected to the oil chamber of the booster, and a pressure tank connected to the gas chamber of the booster a compressed gas sealed therein. The compressed gas is used as a power source to cause oil pressure from the booster to drive the valve-driving actuator and consequently actuate the shut-off valve.

11 Claims, 9 Drawing Sheets

1
VALVE DRIVING APPARATUS

BACKGROUND OF THE INVENTION

1. Field of the Invention

This invention relates to a valve driving apparatus for actuating a shut-off valve or a dump valve provided in a pipeline for conveying a gaseous or liquid substance.

2. Description of Prior Art

In a pipeline of this sort, the gas pipeline has shut-off valves provided individually at various positions over the long distance covered thereby. It is known in the art to operate such a shut-off valve by means of an actuator which uses as the power source thereof a gas pressure of the pipeline extracted from the vicinity of the seat of the shut-off valve.

In this case, however, the apparatus is dangerous because the spent gas emanating from the actuator is released into the open air. Where the gas so released into the open air has the possibility of doing harm to men and beasts, the gas pressure of the pipeline cannot be utilized as the power source. Thus, the practice of additionally providing a separate pressure cylinder of air, nitrogen or carbon dioxide and utilizing this cylinder as a power source is frequently resorted to.

When the pressure cylinder is used as mentioned above, the pressure of the cylinder actuates the shut-off valve in spite of the gas pressure of the gas pipeline and, therefore, must be higher than the pressure required by the actuator. Further, since the cylinder has a limited capacity, the shut-off valve in the process of switching possibly ceases to move normally because of shortage of pressure. The cylinder, therefore, requires enormous labor for the sake of replenishment of its contents or the replacement of itself for a new supply.

If the replenishment or the replacement of the pressure cylinder mentioned above is incomplete, the pressure cylinder may possibly fail to actuate the shut-off valve when needed and consequently cause an accident or even endanger the operation of the gas pipeline.

A valve driving apparatus adapted to utilize line gas in a tightly sealed circuit has been proposed. If this apparatus happens to be deficient in its seal mechanism, the seal part thereof will possibly gather moisture and release the gas into the ambient air after all.

SUMMARY OF THE INVENTION

This invention has been produced for the purpose of solving the problems encountered by the prior art as described above.

An object of this invention is to provide a valve driving apparatus having a pressure tank which has a compressed gas such as a noncombustible gas sealed therein and which is able to have the capacity and pressure thereof produced under perfect conditions by the operation of a gas/oil type booster.

Another object of this invention is to provide a valve driving apparatus which fulfills the desire for dimensional compaction by causing a booster to be disposed inside a gas tank having a compressed as such as a noncombustible gas sealed therein and which excels in safety and economy owing to the preclusion of the leakage of fluid from the tank interior.

According to one aspect of this invention, there is provided a valve driving apparatus for actuating a shut-off valve or a dump valve disposed in a pipeline for the conveyance of a fluid. A gas/oil booster has an oil chamber and a gas chamber. A valve-driving actuator has a cylinder connected to the oil chamber of the gas/oil booster, and a pressure tank is connected to the gas chamber of the gas/oil booster having sealed therein a compressed gas which is used as a power source to cause oil pressure exerted by the booster to drive the valve-driving actuator and consequently actuate the shut-off valve or dump valve.

A selector valve such as a solenoid valve is interposed between the cylinder of the actuator and the gas/oil booster. This selector valve is connected to the oil tank through a switching valve such as a solenoid valve. This oil tank is connected to the booster through an oil pump.

The amount of oil which is discharged by one stroke of the booster should be sufficient for the cylinder to produce not less than two strokes.

The pressure of this pressure tank should be such that the pressure of the booster before the start of the last of the strokes produced by the booster and the pressure thereof after the end of the last stroke suffice for the operation of the actuator. The pressure tank should tolerate the pressure exerted thereon after the booster has returned to its former position.

According to another aspect of this invention, there is provided a valve driving apparatus for actuating a shut-off valve or a dump valve disposed in a pipeline for the conveyance of a fluid comprising a gas tank having sealed therein a compressed gas, a gas/oil booster disposed inside the gas tank so that part of the booster communicates internally with the gas tank, and a valve-driving actuator connected to the booster. The compressed gas of the gas tank is used as a power source to cause oil pressure exerted by the booster to drive the actuator and consequently actuate the shut-off or damp valve.

Preferably, the oil chamber of the gas/oil type booster is connected to the cylinder of the valve driving actuator, the gas/oil booster is disposed inside the gas tank having sealed therein a compressed gas such as nitrogen gas or air, and the actuator is consequently driven by the oil pressure, which is generated by the booster with the pressure of the gas tank as a power source.

More preferably, the amount of oil to be discharged by one stroke of the booster should be sufficient for the cylinder to produce not less than two strokes.

The pressure of this gas tank should be such that the pressure of the booster before the start of the last of the strokes produced by the booster and the pressure thereof after the end of the last stroke suffice for the operation of the actuator. The gas tank should tolerate the pressure exerted thereon after the booster has returned to its former position.

Since this invention has been constructed as described above, it is supposed that the shut-off valve provided in the gas pipeline is in an open state and the gas is flowing in the normal state inside the pipeline.

A gas pipe connected to the pressure tank is connected to the gas chamber of the gas/oil type booster, and therefore is exposed to the pressure of the gas. Otherwise, the gas chamber of the gas tank and the gas chamber of the gas/oil type booster are made to communicate internally with each other and are constantly exposed to the pressure of the gas. The oil chamber of the booster is connected to the cylinder with an oil pipe. By a selector valve which is interposed between the oil chamber and the cylinder, the oil pressure generated in the booster is exerted on the valve-opening side of the cylinder. Meanwhile, the valve-closing side of the cylinder remains in a state connected to an oil tank with an oil pipe. Since the switching valve which is interposed between the cylinder and the oil tank is in a closed state and, as a consequence, the oil cannot be discharged from the cylinder the position of the booster is maintained together with the open state of the shut-off valve.

When the internal pressure of the gas pipeline is lowered on the upstream side or the downstream side because of damage inflicted on the pipe wall, for example, a signal which is automatically issued in consequence of the detection of this accident verges on actuating the shut-off valve mentioned above Since this signal produces a change-over in the selector valve mentioned above, the cylinder discharges the oil from the valve-opening side thereof into the oil tank. As a consequence, the oil pressure originating in the oil chamber of the booster mentioned above reaches the valve-closing side of the cylinder and actuates the cylinder and eventually induces closure of the shut-off valve. Since the switching valve, after this closure, returns to the original state shown in FIG. 1 and the selector valve remains intact, the oil pressure of the booster continues to be exerted on the valve-closing side of the cylinder and consequently the position of the booster is maintained together with the closed state of the shut-off valve.

Optionally, the booster now in the state following on the preceding operation may be returned to the original position by causing a position detecting mechanism to detect the displacement of the booster. This actuates an oil pressure pump, thereby forwarding the oil in the oil tank to the oil chamber of the booster by reason of increased pressure, and enabling the gas in the gas chamber to be returned to the pressure tank or the gas tank owing to the fact that the oil pressure originating in the oil pressure pump surmounts the pressure exerted on the gas chamber of the booster.

Subsequently, for the purpose of opening the shut-off valve either by means of an operating signal from a control room or manually, the selector valve is switched so that the oil pressure from the booster will be exerted on the valve-opening side of the cylinder and the oil on the valve-closing side of the cylinder will be discharged into the oil tank. As a result, the oil pressure emanating from the oil chamber of the booster actuates the cylinder and consequently opens the shut-off valve. After this opening of the shut-off valve, the switching valve resumes the state shown in FIG. 1 and the oil pressure of the booster remains exerted on the valve-opening side of the cylinder. The shut-off valve in the open state is closed by switching the selector valve.

Even when the selector valve is operated by the use of a manual lever in this case, the shut-off valve or the dump valve can be similarly opened and closed.

When the amount of oil discharged by one stroke of the booster, namely the amount of oil forwarded to the cylinder, suffices to impart not less than two strokes to the cylinder, and the oil tank is amply large, the work of forwarding the oil in the oil tank to the booster by the oil pressure pump as described above may be performed once per not less than two strokes of motion of the cylinder.

Further, when this amount of the oil suffices to impart not less than two strokes of motion to the cylinder, the energy necessary for the impartation mentioned above may be diverted to the actuation of the shut-off valve solely by the operation of two solenoid valves, instead of inducing the return of the booster.

The gas/oil type booster described above should possess, in the range of ordinary fluctuation in the inner gas pressure of the pressure tank or the gas tank, a pressure increase ratio sufficient for the cylinder to be infallibly driven so as to open and close the shut-off valve in proportion to the magnitude of the fluctuation of the torque generated by the fluctuation of the gas pressure and required for opening and closing the shut-off valve.

The solenoid valves to be used for a switching action in the operation of the valve driving apparatus of this invention and the method of operation of the apparatus described thus far are intended to be merely illustrative of, and not in any sense limitative of, the invention. The oil pressure pump may be of a manual type or a powered type or even a remote-control type on the sole condition that it be capable of causing the booster to be returned in spite of the gas pressure. The pressure tank or the gas tank should be designed and manufactured so as to have the highest allowable capacity and pressure.

For the compressed gas in the pressure tank or the gas tank, it is safe to use nitrogen gas or air, for example. The pressure tank of the gas tank is so adapted as to detect a decrease, if any, in the internal pressure of the tank after protracted use and suitably replenish the compressed gas. It is allowable to use natural gas for the compressed gas to be sealed in the pressure tank or the gas tank.

The preceding description has depicted the operation of a shut-off valve which is disposed in a gas pipeline. When the gas pipeline is provided with a dump valve, the dump valve manifests the same operation as the shut-off valve. Thus, a concrete operation of the dump valve will be omitted from the following description.

Specifically, when the dump valve provided in the gas pipeline is in a closed state, the same operation as described above inversely opens the dump valve and starts the flow of gas inside the pipeline.

BRIEF DESCRIPTION OF THE DRAWINGS

The invention will be better understood and objects, features, and characteristics thereof other than those set forth above will become apparent when consideration is given to the detailed description thereof given hereinbelow with reference to the annexed drawings.

DETAILED DESCRIPTION OF THE PREFERRED EMBODIMENTS

Figure 1:
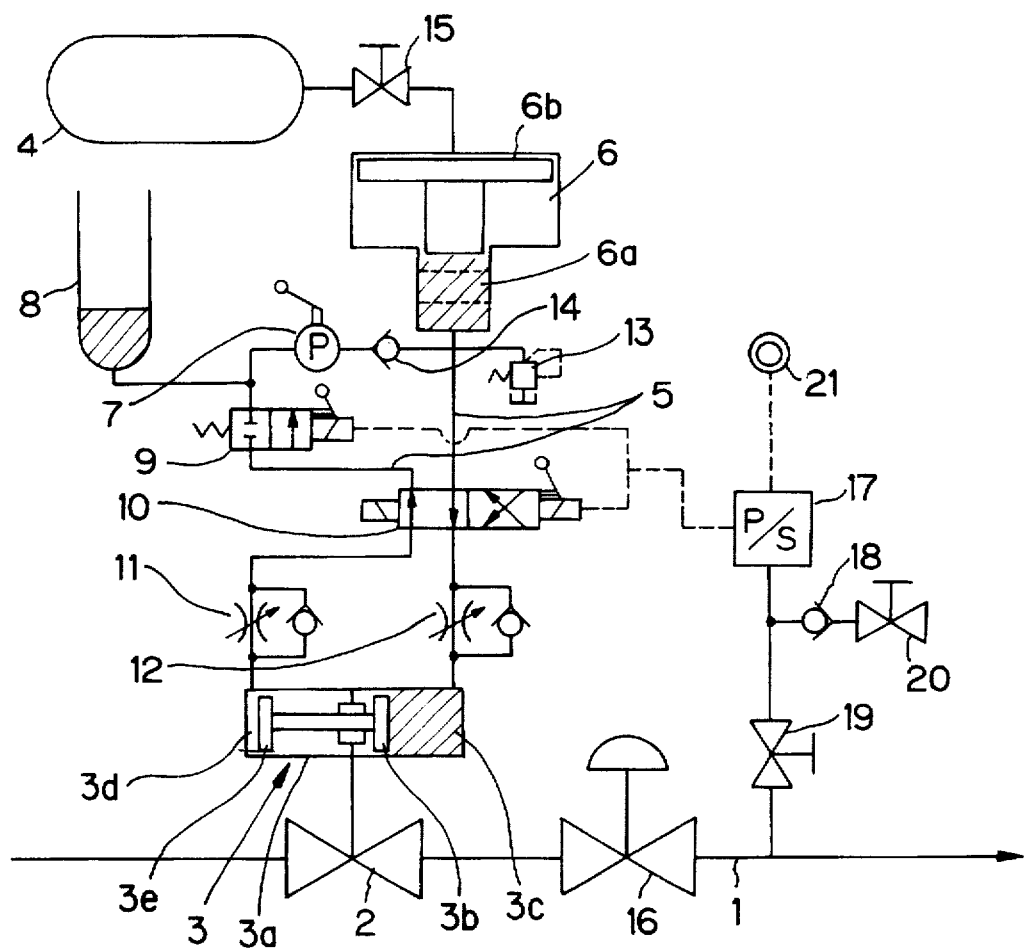
FIG. 1 is a piping system diagram showing a valve driving apparatus of one embodiment of this invention.
Figure 3:
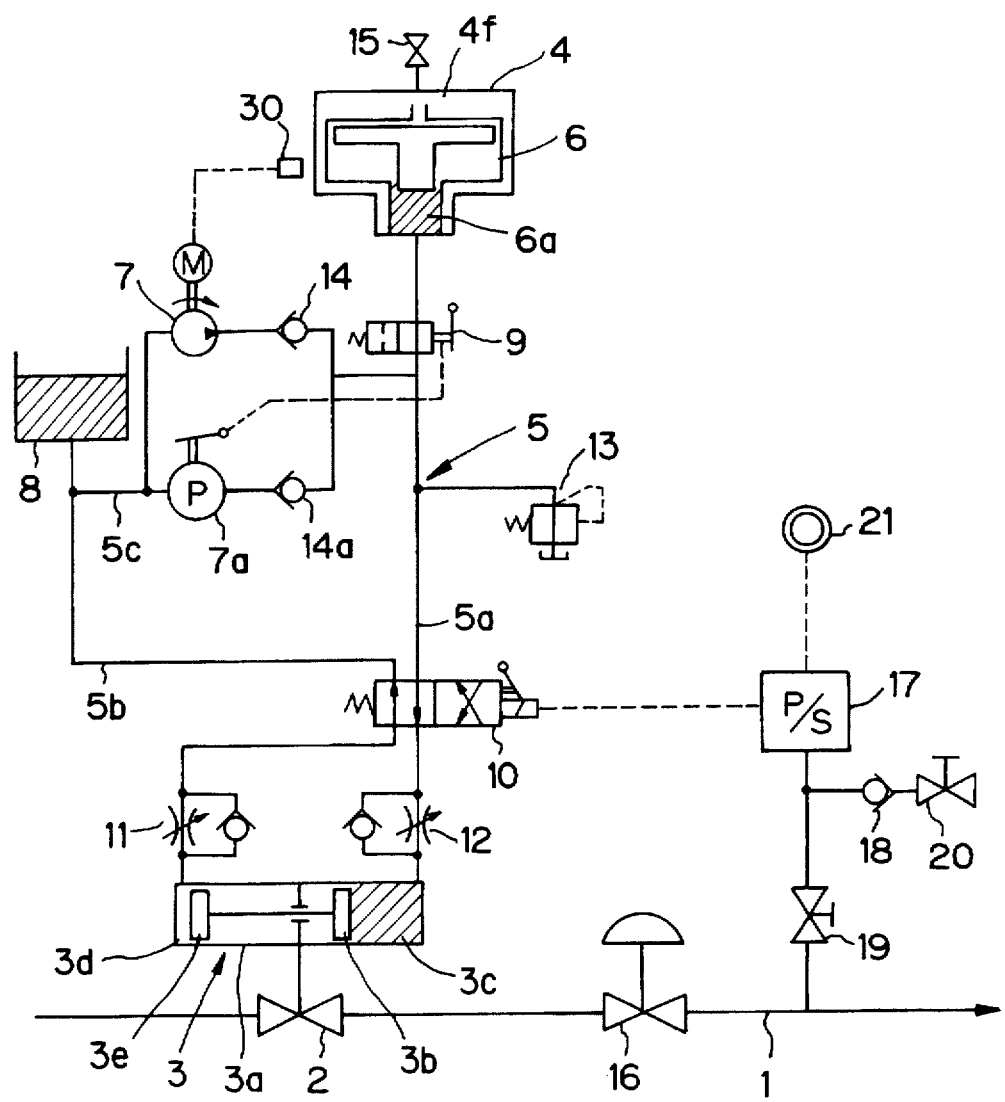
FIG. 3 is a piping system diagram showing a valve driving apparatus of another embodiment of this invention.

FIG. 1 and FIG. 3 are piping system diagrams showing embodiments of this invention having a valve driving apparatus applied to a shut-off valve disposed in a pipeline.

In the diagrams, 1 stands for a gas pipeline in which a gas is flowing in the direction indicated by an arrow mark, 2 for a shut-off valve provided in the gas pipeline 1, and 3 for an oil pressure cylinder type actuator attached to the shut-off valve 2 and adapted to open and close the shut-off valve 2. By the actions of pistons 3b and 3c under oil pressure inside a cylinder 3a of this actuator 3, the shut-off valve 2 is opened and closed. FIG. 1 or FIG. 3 represents the case of having the shut-off valve 2 in an open state.

In FIG. 1, 4 stands for a pressure tank having sealed therein a noncombustible gas such as nitrogen or air. A gas/oil type booster 6 is interposed between the pressure tank 4 and an oil pipe 5 connected to the cylinder 3a. By the oil pressure exerted in the oil pipe 5 by the booster 6, using as a power source therefor the internal pressure of the pressure tank 4, the actuator 3 is operated to actuate the shut-off valve 2.

In FIG. 3, 4 stands for a gas tank having sealed therein a noncombustible gas such as nitrogen or air. Inside this gas tank 4, a gas/oil type booster 6 is disposed, as will be explained in detail hereinafter. An oil pipe 5a connected to a cylinder 3a is connected to a gas/oil type booster 6. By the oil pressure exerted in the oil pipe 5a by the booster 6, using as a power source therefor the internal pressure of the gas tank 4, the actuator 3 is operated to actuate the shut-off valve 2.

With reference to FIG. 1 or FIG. 3, when the shut-off valve 2 is supposed to produce plural (two or three) motions, the booster 6 has only to generate the amount of oil necessary for that many motions.

In the diagram, the oil pipe 5 is provided with an oil pressure pump 7 and is connected to an oil tank 8. By pressure exerted by the oil pressure pump 7 to a level higher than the internal pressure of the oil pipe 5, the oil in the oil pump 7 plus the oil in the oil tank 8 is delivered into an oil chamber 6a of the booster 6 to return the booster 6 to its original position. As a result the gas in a gas chamber 6b of the booster 6 will be returned into the pressure tank 4.

In FIG. 3, the oil tank 8 is connected to the oil pipe 5b. A position detection sensor 30 for detecting the displacement of the booster 6 is connected to the oil pipe 5c which is connected to the oil tank 8. With the position detection sensor 30, the oil pressure pump 7 is automatically operated to generated a pressure at a level higher than the internal pressure of the oil pipe 5a. By this pressure, the oil in the oil pipe 5 plus the oil in the oil pressure tank 8 is delivered into the oil chamber 6a of the booster 6. As a result the oil in the oil chamber 6a of the booster 6 is automatically replenished. The oil pipe 5a is provided midway along the length thereof with a switching valve 9. Further, the oil pipe 5c may be furnished with a hand pump 7a which is adapted to replenish the oil in the oil chamber 6a of the booster 6.

Figure 9:
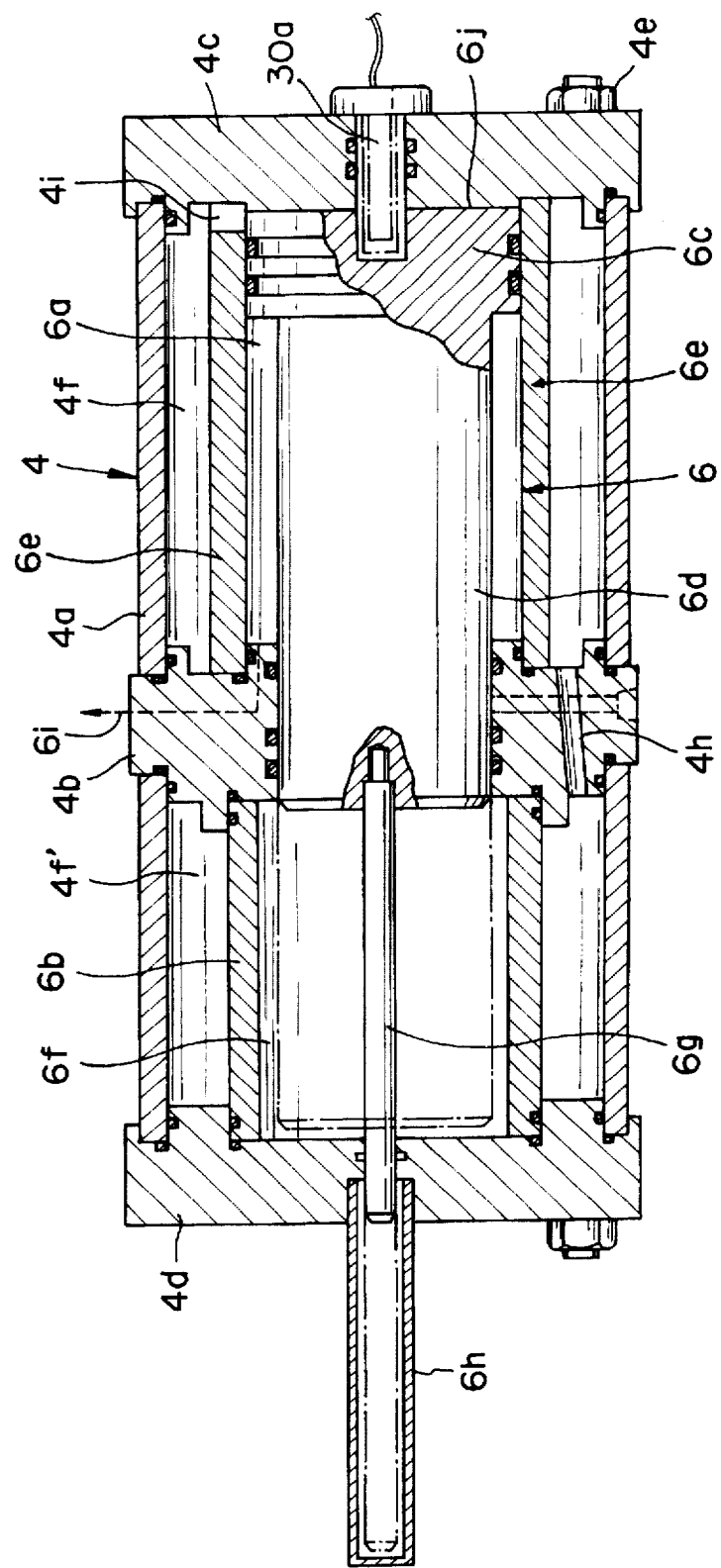
FIG. 9 is a cross section showing an example of the disposition of a booster in a gas tank.

Various constructions of the gas tank 4 and the booster 6 shown in FIG. 3 will be described below. In the construction of FIG. 9, a gas cylinder 4a is provided at a middle position thereof with a center flange 4b and at opposite end parts thereof with head covers 4c and 4d. These annexed components are sealed by means of welding or by the use of O rings and the gas tank 4 plus the components is airtightly assembled with the aid of tie rods 4e.

The gas/oil type booster 6 is encased in this gas tank 4. To be specific, an oil cylinder 6e is disposed concentrically with the gas cylinder 4a between the head cover 4c and the center flange 4b. The empty space surrounding this oil cylinder 6e serves as a gas chamber 4f of a gas tank 4. This gas chamber 4f is made to communicate with a gas chamber 6j of the piston 6c through a communicating mouth 4i. Further, a partitioning cylinder 6b is disposed concentrically with the gas tank 4 between the head cover 4d and the center flange 4b. The empty space surrounding the partitioning cylinder 6b serves as a gas chamber 4f of the gas tank 4. This gas chamber 4f is made to communicate with the gas chamber 4f of the gas tank 4 through a communicating hole 4h. The booster 6 is furnished with a piston 6c, a piston rod 6d, and the oil chamber 6a and also with an oil port 6i for connecting the oil chamber 6a to the cylinder 3a of the actuator 3. It is further furnished at the leading end of the piston rod 6d thereof with an ambient air chamber 6f, a small rod 6g, and an indicator 6h. A sensor 30a is adapted to detect removal of the piston 6c by a prescribed distance and actuate the oil pressure pump.

Figure 10:
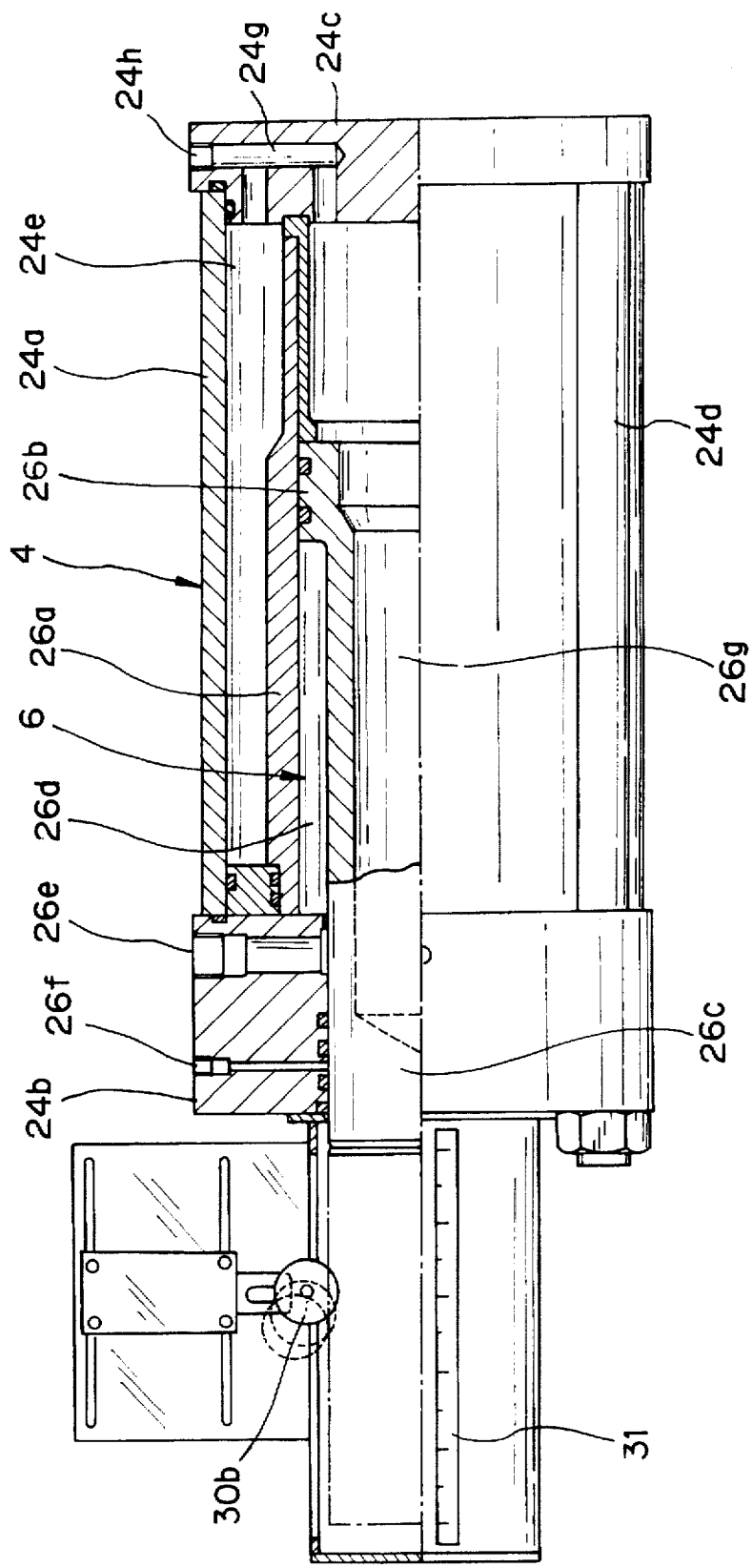
FIG. 10 is a cross section showing another example of the disposition of a booster in a gas tank.

FIG. 10 shows another embodiment of the gas/oil type booster 6 which is encased in the gas tank 4. A gas cylinder 24a has the opposite ends thereof sealed by attaching a head cover 24b and a head cover 24c thereto by means of welding or by the use of O rings and fastening these head covers thereto airtightly with a tie rod 24d.

An oil cylinder 26a is disposed concentrically with the gas cylinder 24a. The empty space surrounding the oil cylinder 26a serves as a gas chamber 24e for the gas tank 4. The booster 6 is provided therein with a piston 26b and a piston rod 26c. An oil chamber 26d is disposed between the oil cylinder 26a and the piston rod 26c. The head cover 24b is provided with an oil port 26e and a drain port 26f which are made to communicate with the oil chamber 26d and are further connected to the actuator 3.

The inner parts of the piston 26b and the piston rod 26c are depressed to form a gas chamber 26g. The head cover 24c is provided with a communicating hole 24g serving to establish communication between the gas chamber 26g and the gas chamber 24e. It is also provided with a gas port 24h.

The piston rod 26c is provided at a leading end part thereof with a scale 31 and a limit switch 30b capable of keeping track of the advancing position of the piston rod 26c and, at the same time, adjusting this position by impartation of necessary motion (or any alternative capable of fulfilling the same function). This switch 30b is so disposed that the piston rod 26c in motion ultimately collides therewith and consequently induces actuation of the oil pressure pump 7.

Figure 11:
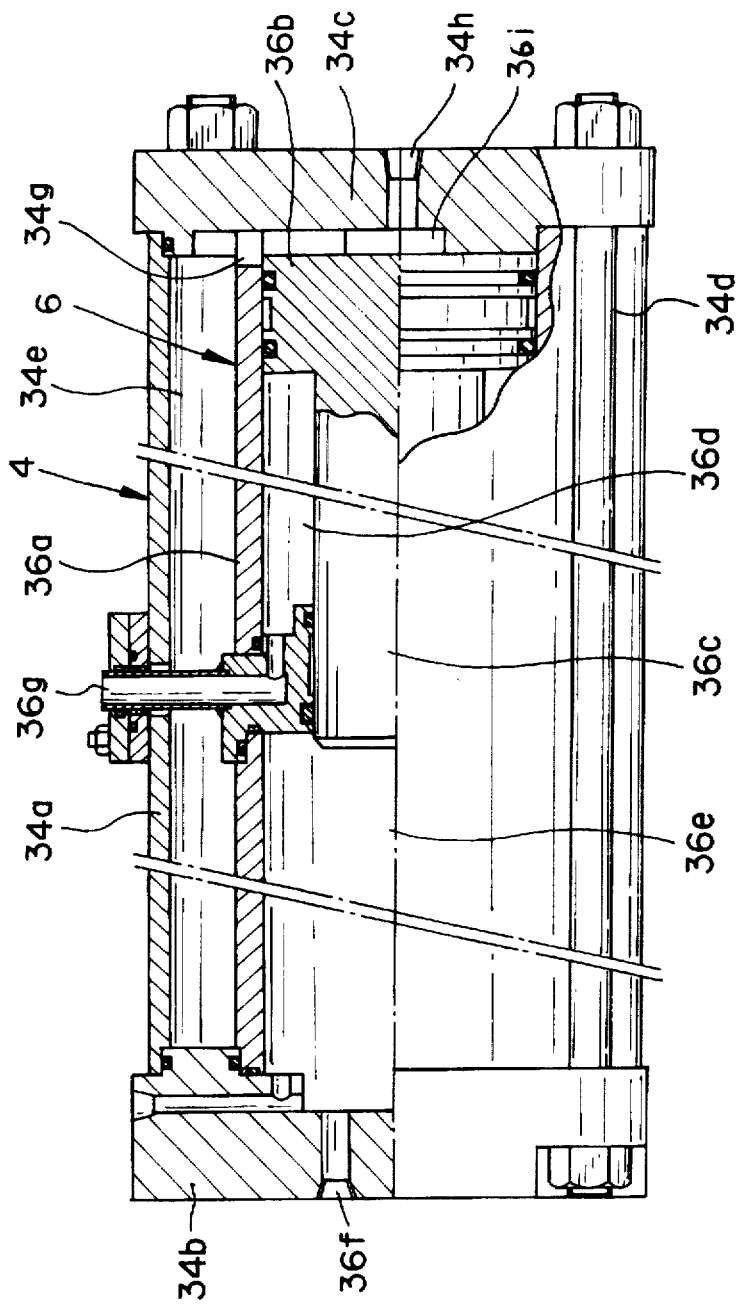
FIG. 11 is a cross section showing still another example of the disposition of a booster in a gas tank.

FIG. 11 shows still another embodiment of the gas/oil type booster 6, which is disposed in the gas tank 4. A gas cylinder 34a has the opposite ends thereof sealed by attaching a head cover 34b and a head cover 34c thereto by means of welding or by the use of O rings and fastening these head covers thereto airtightly with a tie rod 34d.

An oil cylinder 36a is disposed concentrically with the gas cylinder 34a. The empty space surrounding the oil cylinder 36a serves as a gas chamber 34e for the gas tank 4. The booster 6 is provided therein with a piston 36b and a piston rod 36c. The empty space between the oil cylinder 36a and the piston rod 36c serves as an ambient air chamber 36d. A communicating hole 34g establishes communication between a gas chamber 34e and a gas chamber 36i. A gas port 34h is further provided therein. An oil port 36f is provided at the leading end of oil chamber 36e, which is disposed at the leading end of the piston rod 36c. To keep track of the moving position of the piston rod 36c, a suitable position detecting mechanism 30, which is adapted to utilize the ambient air port 36g, is provided.

Now, the ratios of magnification of the gas tank and the booster mentioned above will be discussed below.

Figure 6:
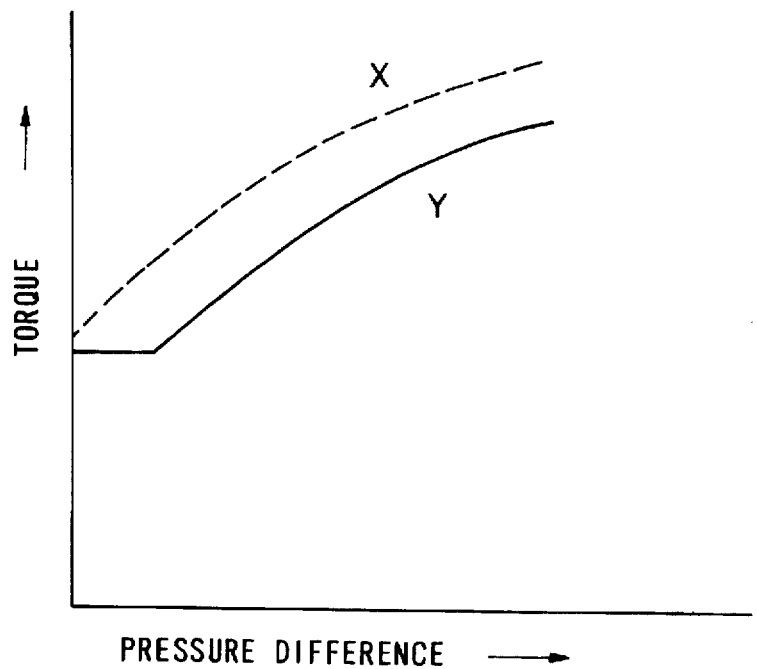
FIG. 6 is a diagram comparing output torques of a valve driving apparatus.

With respect to the ratio of magnification of the booster 6, the valve is made to operate normally by causing a torque X obtained as the product of the valve driving apparatus proper (the diameter of the cylinder and the length of the arm) multiplied by the ratio of magnification of the booster to remain constantly above the necessary torque Y of the valve in the range of fluctuation of the pressure of the gas tank to be extracted as the power source as shown in FIG. 6.

The state of affairs involved in this case will be discussed below with reference to an explanatory diagram of FIG. 7. It is supposed that the relevant apparatus is intended for a ball valve having a necessary torque of 2200 kgm and the actuator to be used therein is in the form of a ram type scotch yoke. When the operating principle of this apparatus requires the pressure of a power source to be raised by a booster before it is fed into the actuator, the output torque T is as shown below in the case where the transmission efficiency is set to be 1. When the power source pressure P indicated in FIG. 5 has a magnitude of 70 kgf/cm²G as shown in Formula (1) below in which M stands for oil pressure when gas pressure is set to be 1, therefore, it is noted that the output torque surpasses the necessary torque.

Figure 7:
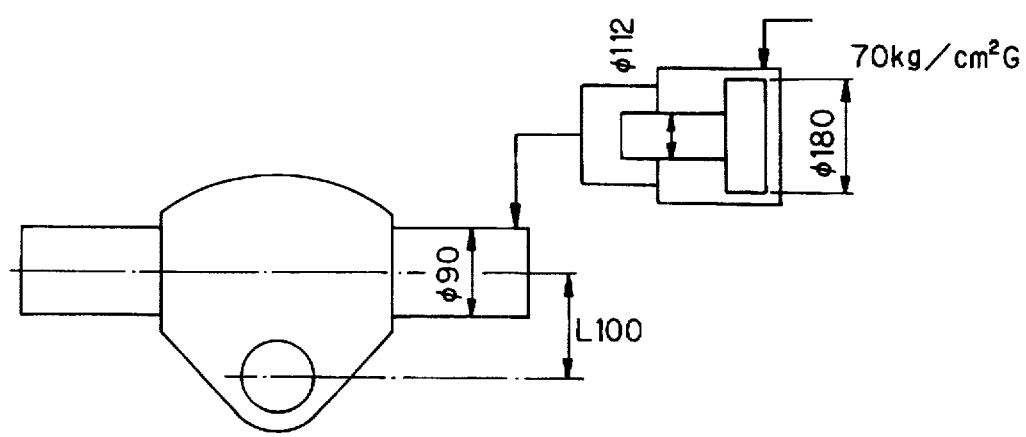
FIG. 7 is an explanatory diagram aiding in the illustration of an output torque of an actuator.

Incidentally, the booster whose dimensions are shown in FIG. 7 is presumed to possess the construction of FIG. 11. Of course, the constructions of FIG. 9 and FIG. 10 produce the same function as that of FIG. 11. When they have the same ratio of pressure increase as that of FIG. 11, however, their dimensions are different from those of the construction of FIG. 11.

$$T = \frac{\pi}{4} \times d^2 \times L \times P \times M \times 2 \quad (1)$$
$$= \frac{\pi}{4} \times 9^2 \times 10 \times 70 \times 2.58 \times 2$$
$$= 229785 \text{ kgcm}$$
$$= 2297 \text{ kgm} > 2200 \text{ kgm}$$

In the case of using a gas tank 4 shown in FIG. 1 as a power source, the initial pressure and the capacity of this gas tank 4 are found in accordance with the formulas shown below.

This actuator 3 is intended for emergency shutoff, designed to keep the valve constantly in an open state, and adapted to produce the three actions, i.e. open → close → open → close, even during power failure. In this case, the second action of close → open has a large torque and, therefore, requires the necessary torque mentioned above.

The volume of motion of the oil of the actuator 3 is expressed by the following formula.

$$\frac{\pi}{4} \times 9^2 \times 10 \times 2 = 1272.3 \text{ cm}^3 \quad (2)$$

The amount of motion of the rod of the booster 6 is expressed by the following formula.

$$\frac{1272.3}{\frac{\pi}{4} \times 11.2^2 \times l_1} \rightarrow l_1 = 12.91 \text{ cm} \quad (3)$$

The capacity W on the power source side of the booster 6 necessary for one action of the rod is expressed by the following formula.

$$W = \frac{\pi}{4} \times 18^2 \times 12.91 \quad (4)$$
$$= 3285 \text{ cm}^3$$
$$\approx 3.3 \, l$$

On the assumption that the capacity of the gas tank 4 is 20 liters and the initial pressure thereof is 80 kgf/cm²G, the pressure P1 of the gas tank 4 after completion of one action (prior to the second action) is expressed by the following formula.

$$P1 = \frac{(80 + 1.033) \times 20}{20 + 3.3} \quad (5)$$
$$= 69.556 \text{ kgf/cm}^2$$
$$= 68.523 \text{ kgf/cm}^2 G \text{ (gauge pressure)}$$

The pressure P2 of the gas tank 4 after completion of two actions (prior to the third action) is expressed by the following formula.

$$P2 = \frac{(68.523 + 1.033) \times (20 + 3.3)}{20 + 3.3 + 3.3} \quad (6)$$
$$= 60.927 \text{ kgf/cm}^2$$
$$= 59.894 \text{ kgf/cm}^2 G \text{ (gauge pressure)}$$

The pressure P3 of the gas tank 4 after completion of three actions is expressed by the following formula.

$$P3 = \frac{(59.894 + 1.033) \times (20 + 3.3 + 3.3)}{20 + 3.3 + 3.3 + 3.3} \quad (7)$$
$$= 54.203 \text{ kgf/cm}^2$$
$$= 53.170 \text{ kgf/cm}^2 G \text{ (gauge pressure)}$$

The output torque T2 at the beginning of the second action is expressed by the following formula.

$$T2 = \frac{\pi}{4} \times 9^2 \times 10 \times 68.523 \times 2.58 \times 2 \quad (8)$$
$$= 224937 \text{ kgcm}$$
$$= 2249 \text{ kgm}$$

The output torque T3 at the beginning of the third action is expressed by the following formula.

$$T3 = \frac{\pi}{4} \times 9^2 \times 10 \times 59.894 \times 2.58 \times 2 \quad (9)$$
$$= 196611 \text{ kgcm}$$
$$= 1966 \text{ kgm}$$

The output torque T4 after completion of the third action is expressed by the following formula.

$$T4 = \frac{\pi}{4} \times 9^2 \times 10 \times 53.170 \times 2.58 \times 2 \quad (10)$$
$$= 174538 \text{ kgcm}$$
$$= 1745 \text{ kgm}$$

Figure 8:
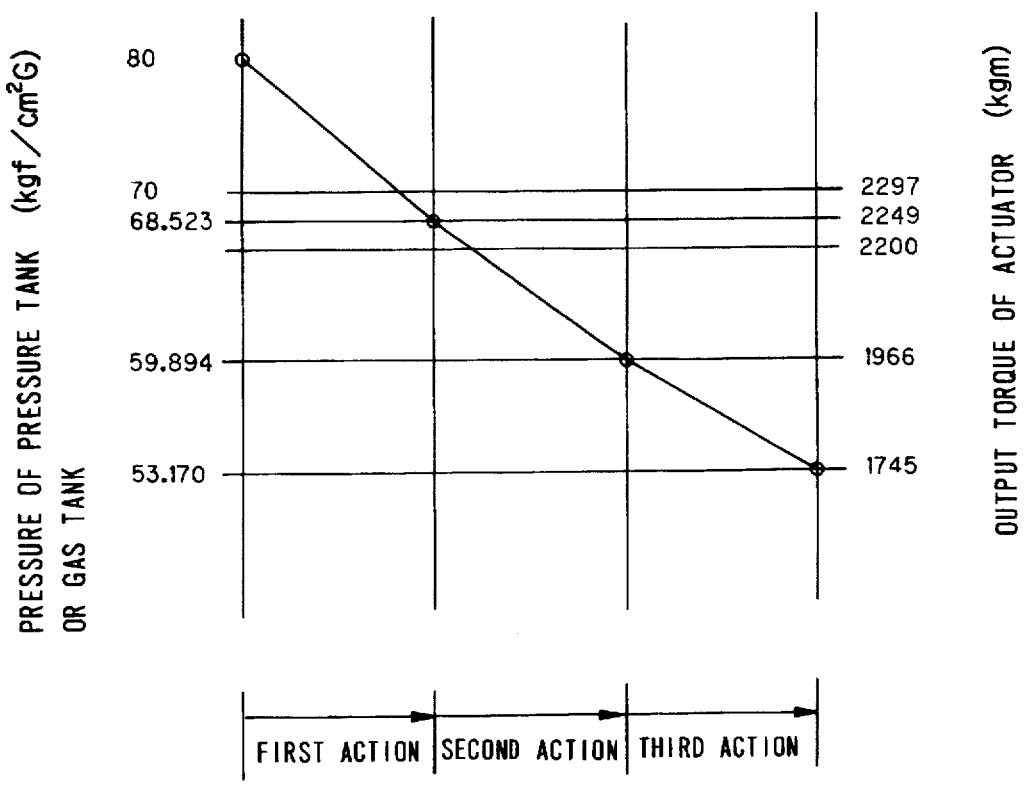
FIG. 8 is a diagram showing the relation between the pressure of a tank and the output torque of an actuator.

A graph which is obtained by plotting these results is shown in FIG. 8.

Incidentally, a torque of about 450 kgm suffices to effect the action of open → close of the shut-off valve 2 of the present case.

The data given above clearly indicate that the capacity of 20 liters and the initial pressure of 80 kgf/cm²G are found by the calculations of the foregoing formulas to be sufficient for the gas tank 4. The experiment described above is meant as one preferred embodiment of this invention. Naturally, it is not meant to limit this invention in any sense.

Figure 5:
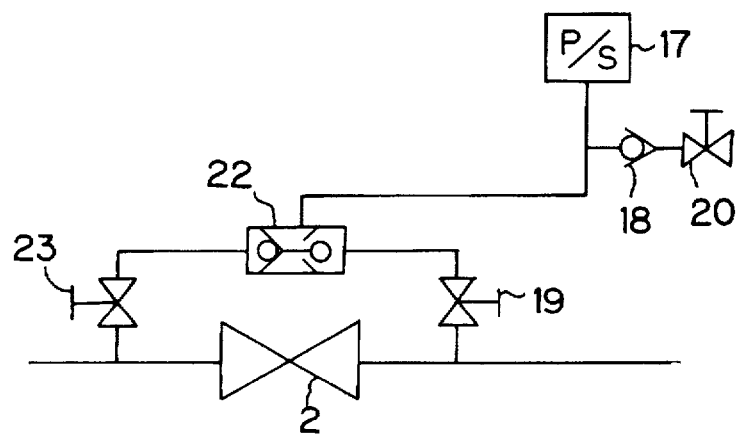
FIG. 5 is a partial piping system diagram of the apparatus of FIG. 1 and of FIG. 3.

In FIG. 1, reference numeral 9 stands for a switching solenoid valve and 10 for a selector solenoid valve. For these solenoid valves 9 and 10, a four-way solenoid valve or a pair of two-way solenoid valves may be used. Then, 11 and 12 stand for speed controllers, 13 stands for a relief valve, 14 for a check valve, 15 for a closure valve, 16 for a flow control valve, 17 for a pressure switch, 18 for a check valve, 19 and 20 for closure valves, and 21 for an electric power source. A broken line indicates an electric wiring for control. In FIG. 5, 22 stands for the pilot pressure outlet valve for detection of the low pressure flow side of a shut-off valve 2, and 23 for a switching valve.

Advantageously, the switching solenoid valve 9 mentioned above is so constructed as to keep the booster fast in position even if the switching solenoid valve 10 should cause a leakage. Particularly when this solenoid valve 9 is of a nonleak (perfect seal) type, the booster is enabled to keep its position fast for a long time.

In FIG. 3, reference numeral 9 stands for a manual switching valve and 10 for a selector solenoid valve. For the solenoid valve 10, a four-way solenoid valve or a pair of two-way solenoid valves may be used. Then, 11 and 12 stand for speed controllers, 13 stands for a relief valve, 14 for a check valve, 15 for a closure valve, 16 for a flow control valve, 17 for a pressure switch, 18 for a check valve, 19 and 20 each for closure valves, and 21 for an electric power source. A broken line indicates an electric wiring for control. In FIG. 5, 22 stands for a pilot pressure outlet valve for detection of the low pressure flow side of a shut-off valve 2, and 23 for a switching valve.

Now, the operation of the embodiment described above will be explained below.

As shown in FIG. 1, an oil pipe 5 which is disposed between a booster 6 and a cylinder 3a is provided with the switching solenoid valve 9, the switching solenoid valve 10, an oil pressure pump 7, the speed controllers 11 and 12, the check valve 14, and the relief valve 13. The switching solenoid valve 9 and the selector solenoid valve 10 are severally furnished with levers for manual operation. They are adapted to be actuated by an emergency signal which will be described fully afterward or by an operating signal issued from a control room.

Oil pipes 5a, 5b and 5c which are disposed between the booster 6 and the opposite sides of the cylinder 3a are provided with the switching solenoid valve 10, the oil pressure pump 7, a manual pump 7a, the speed controllers 11 and 12, the check valve 14, a check valve 14a, and the relief valve 13 as shown in FIG. 3. The switching solenoid valve 10 is furnished with levers for manual operation and is adapted to be actuated by an emergency signal which will be described fully afterward or by an operating signal issued from a control room.

As shown in FIG. 1, the shut-off valve 2 is in an open state and the gas is consequently allowed to flow in the normal condition in the direction indicated by an arrow mark inside the pipeline.

The gas chamber 6b of the gas/oil type booster 6 is exposed to the gas pressure which emanates from the pressure tank 4 having sealed therein a noncombustible gas such as nitrogen and advances through the gas pipe 4a. In this case, it is allowable to use natural gas for the compressed gas sealed in the pressure tank 4. The oil chamber 6a of the booster 6 is connected to the valve-opening side 3c of the cylinder 3a via the oil pipe 5. The oil pressure raised by the booster 6 using the gas pressure as the power source, therefore, is exerted on the valve-opening side 3c of the piston 3b. Meanwhile, the other side, specifically a valve-closing side 3d of the cylinder 3a, is connected to an oil tank 8 via the selector solenoid valve 10. Since the switching solenoid valve 9 is in a closed state, however, the shut-off valve 2 remains in its open state and, at the same time, keeps the booster fast in position.

Figure 2:
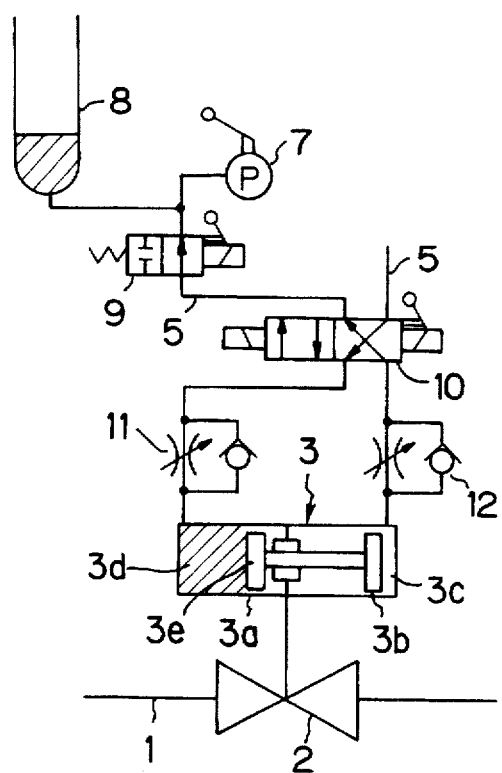
FIG. 2 is a partial piping system diagram showing the valve driving apparatus of FIG. 1 in a state having a closed valve.

If the gas pipeline 1 sustains damage, starts a leak, and consequently suffers a decrease in the pressure on the downstream side thereof, for example, the pressure switch 17 will sense this decrease of pressure and emit a signal to cause emergency closure or release of the shut-off valve 2, or the control room will issue a signal to operate the shut-off valve 2 accordingly. In response to the signal, the selector solenoid valve 10 is switched and, at the same time, the switching solenoid valve 9 is opened as shown in FIG. 2 to establish communication between the valve-opening side 3c of the cylinder 3a and the oil tank 8 and induce discharge of the oil in the valve-opening side 3c of the cylinder 3a into the oil tank 8. As a result, the oil pressure raised by the booster 6 is exerted on the valve-closing side 3d of the cylinder 3a to move piston 3e to the right in FIG. 1 and close the shut-off valve 2 as shown in FIG. 2.

When the oil pressure pump 7 is subsequently actuated, the oil in the oil tank 8 forces its way through the check valve 14 and reaches the oil chamber 6a of the booster 6. The consequent oil pressure overcomes the gas pressure being exerted on the gas chamber 6b of the booster 6 and resets the booster 6 while forcing the gas in the gas chamber 6b to return to the pressure tank 4.

Then, for the purpose of opening the shut-off valve 2 by means of an operating signal from the control room or manually, the selector solenoid valve 10 is switched to induce exertion of the oil pressure from the booster 6 on the valve-opening side 3c of the cylinder and the switching solenoid valve 9 is opened to permit discharge of the oil from the valve-closing side 3d of the cylinder 3a into the oil tank 8. As a result, the oil pressure emanating from the oil chamber 6a of the booster 6 mentioned above actuates the cylinder 3a and opens the shut-off valve 2. After this opening of the shut-off valve 2, since the selector solenoid valve 10 remains in place while the switching solenoid valve 9 resumes the state shown in FIG. 1, the oil pressure of the booster 6 continues to be exerted on the valve-opening side 3c of the cylinder 3b. On the basis of this operating principle, the closing of the shut-off valve 2 is attained by switching the selector solenoid valve 10 and, at the same time, opening the switching solenoid valve 9. Alternatively, the shut-off valve 2 can be similarly opened and closed by the use of the manual levers of the two solenoid valves 9 and 10.

Then, the shut-off valve 2 is in an open state and the gas flows in the normal state in the direction indicated by an arrow mark of the pipeline 1.

The gas chambers 6j, 26g and 36i of the gas/oil type booster 6 are exposed to the gas pressure which emanates from the pressure tank 4 having sealed therein a noncombustible gas such as nitrogen and advances through communicating mouths 4i, 24g and 34g. In this case, it is allowable to use natural gas for the compressed gas to be sealed in the pressure tank 4. The oil chambers 6a, 26d and 36e of the booster 6 are connected to the valve-opening side 3c of the cylinder 3a via the oil ports 6i, 26e and 36f. The oil pressure raised by the booster 6 using the gas pressure as the power source, therefore, is exerted on the valve-opening side 3c of the piston 3b. Meanwhile, the other side, specifically the valve-closing side 3d, of the cylinder 3a is connected to the oil tank 8 via the selector solenoid valve 10.

Figure 4:
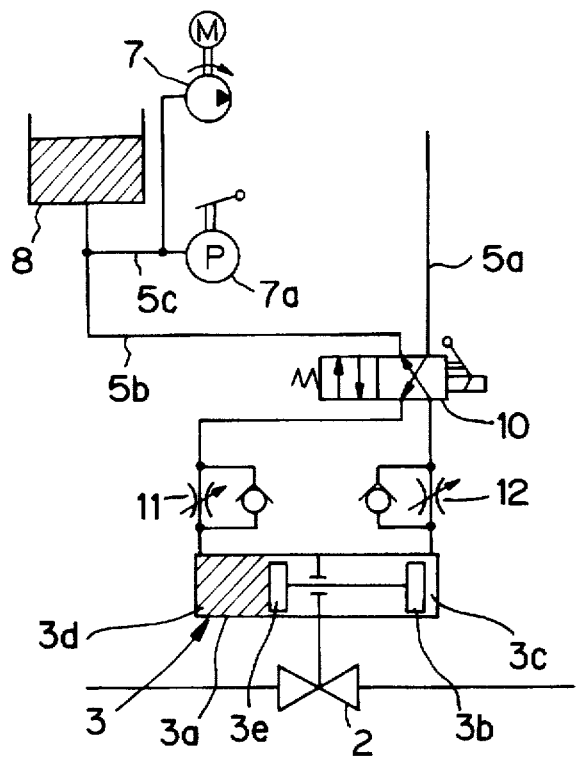
FIG. 4 is a partial piping system diagram showing the valve driving apparatus of FIG. 3 in a state having a closed valve.

If the gas pipeline 1 sustains damage, stars a leak, and consequently suffers a decrease in the pressure on the downstream side thereof, for example, the pressure switch 17 will sense this decrease of pressure and emit a signal to cause emergency closure or release of the shut-off valve 2 or the control room will issue a signal to operate the shut-off valve 2 accordingly. In response to the signal, the selector solenoid valve 10 is switched as shown in FIG. 2 to establish communication between the valve-opening side 3c of the cylinder 3a and the oil tank 8 and induce discharge of the oil in the valve-opening side 3c of the cylinder 3a into the oil tank 8. As a result, the oil pressure raised by the booster 6 is exerted on the valve-closing side 3d of the cylinder 3a to move the piston 3e to the right in the bearings of FIG. 3 and close the shut-off valve 2 as shown in FIG. 4.

When the oil pressure pump 7 is subsequently actuated, the oil in the oil tank 8 forces its way through the check valve 14 and reaches the oil chamber 6a of the booster 6. The consequent oil pressure overcomes the gas pressure being exerted on the gas chamber of the booster 6 and resets the booster 6 while forcing the gas in the gas chamber to return to the pressure tank 4 formed around the periphery of the booster 6.

Then, for the purpose of opening the shut-off valve 2 by means of an operating signal from the control room or manually, the selector solenoid valve 10 is switched to induce exertion of the oil pressure from the booster 6 on the valve-opening side 3c of the cylinder 3a and permit discharge of the oil from the valve-closing side 3d of the cylinder 3a into the oil tank 8. As a result, the oil pressure emanating from the oil chamber of the booster 6 mentioned above actuates the cylinder 3a and opens the shut-off valve 2. After this opening of the shut-off valve 2, the selector solenoid valve 10 remains in place and, therefore, the oil pressure of the booster 6 continues to be exerted on the valve-opening side 3c of the cylinder 3b. According to this operating principle, the closing of the shut-off valve 2 is attained by switching the selector solenoid valve 10.

The booster should possess, in the range of ordinary fluctuation in the inner gas pressure of the gas tank 4, a pressure increase ratio sufficient for the cylinder 3a to be infallibly driven so as to actuate the shut-off valve 2 in proportion to the magnitude of the fluctuation of the torque generated by the fluctuation of the gas pressure and required for actuating the shut-off valve 2. The closure valves 15, 19 and 20 are intended for maintenance and inspection and the relief valve 13 is intended for maintenance of the pipeline including oil pipes.

The valve driving apparatus according to this invention can be used on a shut-off valve which is provided for a pipeline conveying a liquid material besides being used in a gas pipeline.

The embodiments cited above represent cases of using a valve driving apparatus for closing a shut-off valve. This invention can be embodied alternatively in a valve driving apparatus to be furnished for a dump valve incorporated in a gas pipeline.

The function of the dump valve in this embodiment is an alternative to the function of the shut-off valve in any of the preceding embodiments. Otherwise, in terms of construction, operation and effect, the present embodiment is nearly identical with the preceding embodiments.

The valve driving apparatus of this invention avoids the possibility of accidentally releasing the gas being conveyed in a pipeline and can be used with the utmost safety because it uses the gas pressure of the pressure tank having sealed therein a compressed gas such as of noncombustible gas as a power source for the operation of the shut-off valve (or the dump valve).

Further, since the pressure of the pressure tank as a source of motive power is supplied via the booster to the actuator, the valve driving apparatus of this invention permits an optimum selection of the booster and the actuator, and is compact and economical.

Since the valve driving apparatus of this invention has the booster disposed inside the gas tank, which has sealed therein the compressed gas such as noncombustible gas, the apparatus itself can be manufactured compactly. Moreover, the valve driving apparatus contemplated by this invention excels in safety and economy because it has no possibility of leaking a fluid into the ambient air.

What is claimed is:

1. A valve driving apparatus, comprising:

a pipeline valve capable of being opened and closed;

a gas to oil booster comprising an oil chamber and a gas chamber;

a valve driving actuator comprising a cylinder and two piston surfaces, said valve driving actuator being connected to said pipeline valve such that movement of one of said two piston surfaces in one direction causes said valve to be opened and movement of the other of said two piston surfaces causes said valve to be closed;

a tank connected to said gas chamber of said gas to oil booster, said tank having a compressed gas sealed therein, said compressed gas being usable as a power source by decompressing said compressed gas to cause the oil pressure exerted by said booster to drive said valve driving actuator for actuating the valve;

an oil pump fluidly connected with said oil chamber of said gas to oil booster and capable of producing an oil pressure sufficient to recompress said compressed gas in said gas chamber;

a selector valve fluidly connected between said cylinder of said valve driving actuator and said oil chamber of said booster;

an oil tank connected to said oil pump and to said selector valve providing a source of oil for said pump and a reservoir for oil discharged from said valve driving actuator; and first and second fluid passages extending from said two piston surfaces, respectively, to said selector valve, a third fluid passage extending from said selector valve to said oil chamber of said gas to oil booster, and a fourth fluid passage extending from said selector valve to said oil pump;

wherein said selector valve can alternately communicate said first fluid passage with: a) said third fluid passage while said second fluid passage communicates with said fourth fluid passage; and b) with said fourth fluid passage while said second fluid passage communicates with said third fluid passage.

2. The valve driving apparatus of claim 1, wherein said compressed gas comprises a gas selected from the group consisting of compressed air and compressed nitrogen.

3. The valve driving apparatus of claim 1, wherein said selector valve selectively communicates said oil chamber of said booster with one of said two piston surfaces while the other of said two piston surfaces is communicated with said oil tank.

4. The valve driving apparatus of claim 3, and further comprising a switching valve disposed in said third fluid passage extending between said oil chamber of said booster and said selector valve.

5. The valve driving apparatus of claim 4, wherein said oil pump has a fluid input side connected with said oil tank and a fluid output side connected with said third fluid passage between said switching valve and said selector valve.

6. The valve driving apparatus of claim 4, wherein said switching valve and said selector valve are solenoid valves.

7. The valve driving apparatus of claim 3, and further comprising a switching valve disposed in said fourth fluid passage extending from said selector valve to said oil pump such that said oil pump has an input side communicating with said oil tank and with said switching valve and an output side communicating with said third fluid passage extending from said oil chamber of said booster to said selector valve.

8. The valve driving apparatus of claim 1, wherein said booster comprises a cylinder having a first stroke and said cylinder of said valve driving apparatus has a second stroke, and wherein the first stroke displaces a volume of oil corresponding to the amount of oil displaced by at least two of the second strokes, whereby said booster can in one stroke twice operate said valve driving apparatus.

9. The valve driving apparatus of claim 8, wherein said switching valve and said selector valve are solenoid valves.

10. The valve driving apparatus of claim 1, wherein said booster comprises a cylinder having a first stroke and said cylinder of said valve driving apparatus has a second stroke, and wherein the first stroke displaces a volume of oil corresponding to the amount of oil displaced by at least two of the second strokes, whereby said booster can in one stroke twice operate said valve driving apparatus.

11. The valve driving apparatus of claim 1, wherein said gas to oil booster is disposed inside said tank and said gas chamber of said booster is internally connected with said tank.

* * * * *